United States Patent [19]

Petheram

[11] 4,172,185

[45] Oct. 23, 1979

[54] METHOD OF REGENERATING WEAK BASE ION EXCHANGE RESINS WITH A SOLUTION OF CARBONIC ACID

[75] Inventor: Harry H. Petheram, Clinton, Iowa

[73] Assignee: Standard Brands Incorporated, New York, N.Y.

[21] Appl. No.: 966,291

[22] Filed: Dec. 4, 1978

Related U.S. Application Data

[63] Continuation of Ser. No. 781,810, Mar. 28, 1977.

[51] Int. Cl.$^2$ .......................... B01D 15/06; B01J 1/09
[52] U.S. Cl. ........................................ 521/26; 210/32
[58] Field of Search ............................. 210/32; 521/26

[56] References Cited

U.S. PATENT DOCUMENTS 2,404,367  7/1946  Durant et al. .......................... 210/24

Primary Examiner—Joseph L. Schofer
Assistant Examiner—Peter F. Kulkosky

[57] ABSTRACT

After weak base ion exchange resins are regenerated and washed with water, the resins are contacted with a solution of carbonic acid to remove the remaining regenerant wastes.

9 Claims, 5 Drawing Figures $CO_2$ USAGE DURING FAST RINSE
TO ACHIEVE EFFLUENT pH OF ABOUT 9

NUMBER OF REGENERATION CYCLES
OF RESIN (DUOLITE ES-561)

ppm Na IN RINSE WATER EFFLUENT vs RINSE WATER VOLUME pH OF SYRUP EXITING COLUMN vs PERIOD OF SYRUP EXITING COLUMN

METHOD OF REGENERATING WEAK BASE ION EXCHANGE RESINS WITH A SOLUTION OF CARBONIC ACID

This is a continuation of application Ser. No. 781,810, filed Mar. 28, 1977.

BACKGROUND OF THE INVENTION

1. Field of the Invention

This invention relates to a method of treating weak base ion exchange resins. More particularly, the invention relates to a method of treating weak base ion exchange resins whereby the regenerated resins are washed with water to remove a portion of the regenerant wastes and then washed with a solution of carbonic acid to remove substantially all the remaining regenerant wastes.

2. Description of the Prior Art

Ion exchange processes generally involve a reversible chemical reaction between a solid ion exchanger and an aqueous solution whereby ions are interchanged between the exchanger and the solution. The most widely used exchangers are ion exchange resins which comprise, for the most part, insoluble organic polymer matrices having attached functional groups which provide mobile ions which may be exchanged for ions in the solution bearing the same charge. To impart increased stability to the resins, the matrices are usually prepared by addition copolymerization reactions which provide varying degrees of crosslinking. Depending upon the nature of the functional group, ion exchange resins are classified broadly as strong acid, weak acid, strong base and weak base. The acid exchange resins are further classified as cation exchangers while the base exchange resins are usually referred to as anion exchangers.

Strong acid cation exchange resins typically comprise sulfonated copolymerized styrene-divinylbenzene products crosslinked to varying degrees. Such resins are widely used in water conditioning, demineralization of sugar and corn syrups, chromatographic separations, and metal recovery.

Weak acid cation exchange resins are commonly prepared by reacting an unsaturated carboxylic acid, e.g., acrylic or methacrylic acid, with a crosslinking agent such as divinylbenzene or ethylene dimethacrylate. Functional groups may comprise phenolic, phosphonous or carboxylic entities, combinations of these and others. Weak acid resins have found application in water conditioning, chromatographic separation, and metal recovery.

Strong base anion exchange resins generally are prepared by affixing quaternary ammonium groups to a polystyrene divinylbenzene matrix. Resins of this type are used principally in water conditioning.

Weak base anion exchange resins contain primary, secondary and tertiary amine groups or mixtures of such groups. Such resins are available in a variety of types including condensation products of amines with formaldehyde, alkyl dihalides, chloromethylated styrene-divinylbenzene, etc. Resins of this type are used principally in demineralization of corn syrups and corn sugar.

Ion exchange resins may be used in batch or column type operations. The latter type of operation is the most widely used in industrial operations. In this case, a column or a vertical cylinder is filled with the resin, and the resin is supported by a porous plate or other means which is permeable to the solution to be treated. The solution may be passed down through the resin (downflow operation) or up through the resin (up-flow operation). Resin columns may also be operated using counter-current flow techniques whereby the feed solution is passed downwardly and the regenerate upwardly or vice versa.

A typical cycle for the operation of an ion exchange column is as follows:

1. Exhaustion Step

The solution being treated is passed through the column in order to remove ions by exchanging them for an equivalent amount of similarly charged ions on the resin until the resin is essentially exhausted of the latter ions.

2. Regeneration Step

A solution containing the necessary ion to recharge the resin is passed through the column.

3. Rinse Step

Water is passed through the column to remove regenerant waste products and excess regenerant. Regenerant waste products are materials which are chemically or physically adsorbed on the resin during the exhaustion step.

Certain optional steps may also be carried out. For example, when the solution being treated is of significant economic importance, a rinse step may be included before regeneration to preclude mixing of the solution being treated and the regenerant. Also, there may be included a backwash prior to regeneration whereby, the upward flow of water removes insoluble contaminates and the resin bed is loosened.

Weak base resins have found wide application in deionization of corn syrups, including high fructose corn syrups, for the purpose of removing salts and weakly acidic colored bodies. Other types of resins are also used for purification or refining such syrups.

Since ion exchange resins, including weak base resins, contain a finite number of ion exchange sites, the exchange capacity of the resin eventually becomes effectively exhausted. The length of time for this to occur is dependent upon the amount of ionic material removed from the solution and the flow rate of the solution through the resin. The economics of ion exchange refining make it desirable that the resins be reused.

When weak base anion exchange resins are utilized to refine or purify corn syrups and the ion exchange capacity is effectively exhausted, the typical regeneration cycle is:

(1) The ion exchange column is "sweetened off" by displacement of the syrup from the resin with water.

(2) Water is passed upwardly through the column to backwash the resin and thereby remove insoluble debris which was filtered out of the corn syrup and also to reclassify the resin in the column so as to minimize pressure drop and channelling.

(3) The resin is regenerated to the weak free base form by passing downwardly therethrough, for instance, a solution at suitable concentration of NaOH, $Na_2CO_3$, ammonia or the like to regenerate the ion exchange capacity of the resin. The regenerant solution may be passed through the bed until typically about one bed volume of regenerant is in contact with the resin.

(4) The regenerant is displaced from the column by slow addition of rinse water which additionally removes a considerable portion of the regenerant waste products. This rinse is referred to in the art as the "slow rinse step" since the rate at which water is introduced into the column approximately equals the rate at which the regenerant was introduced into the column. If the rate the regenerant is passed through the resin column is too rapid, the contact period necessary for satisfactory regeneration to take place may be too short.

(5) More water is passed through the column to remove the remaining regenerant and waste products. This is generally referred to in the art as the "fast rinse step" since the rate at which water is passed through the resin bed is typically about three times faster than that utilized in the slow rinse step. The fast rinse is continued until the resin is essentially free of regenerant solution as determined by measuring the pH or conductivity of the column effluent.

After several regeneration cycles, the weak base anion exchange resins require more rinse water to achieve the same degree of ion exchange capacity. S. B. Applebaum, Demineralization by Ion Exchange, pp. 146-147, Academic Press, New York (1968) attributed this need for more water to oxidative attack by the water which causes the formation of weak acid groups on the resin which combine with sodium or like ions thereby hindering the removal of regenerant waste products by rinse water. One proposed solution to this problem was the utilization of a solution containing relatively small amounts of ammonia for regeneration. However, this approach suffers from the disadvantage that, when dealing with large amounts of regenerant, the ammonia present interferes with the operation of biological waste treatment facilities. Another solution was to use heated water for rinsing, however, this requires energy expenditures and has the tendency to cause physical deterioration of the resin.

OBJECTS OF THE INVENTION

It is a principal object of the present invention to provide a process for regenerating weak base anion exchange resins.

It is another object of the invention to provide a process for regenerating weak base anion exchange resins whereby regeneration may be accomplished in a relatively short period.

It is still a further object of the invention to provide a process for regenerating weak base ion exchange resins whereby the effective life of said resins is increased.

These objects and other objects of the invention will be apparent from the following description and claims.

SUMMARY OF THE INVENTION

Exhausted weak base anion exchange resins are contacted with a regenerant solution under conditions whereby the anion exchange capacity of the resins is substantially restored and regenerant waste products are produced. The resins are then washed with water or carbonic acid to remove a portion of the regenerant waste products and finally washed with a solution of carbonic acid to remove additional amounts of regenerant waste products.

DETAILED DESCRIPTION OF THE INVENTION

Figure 1:
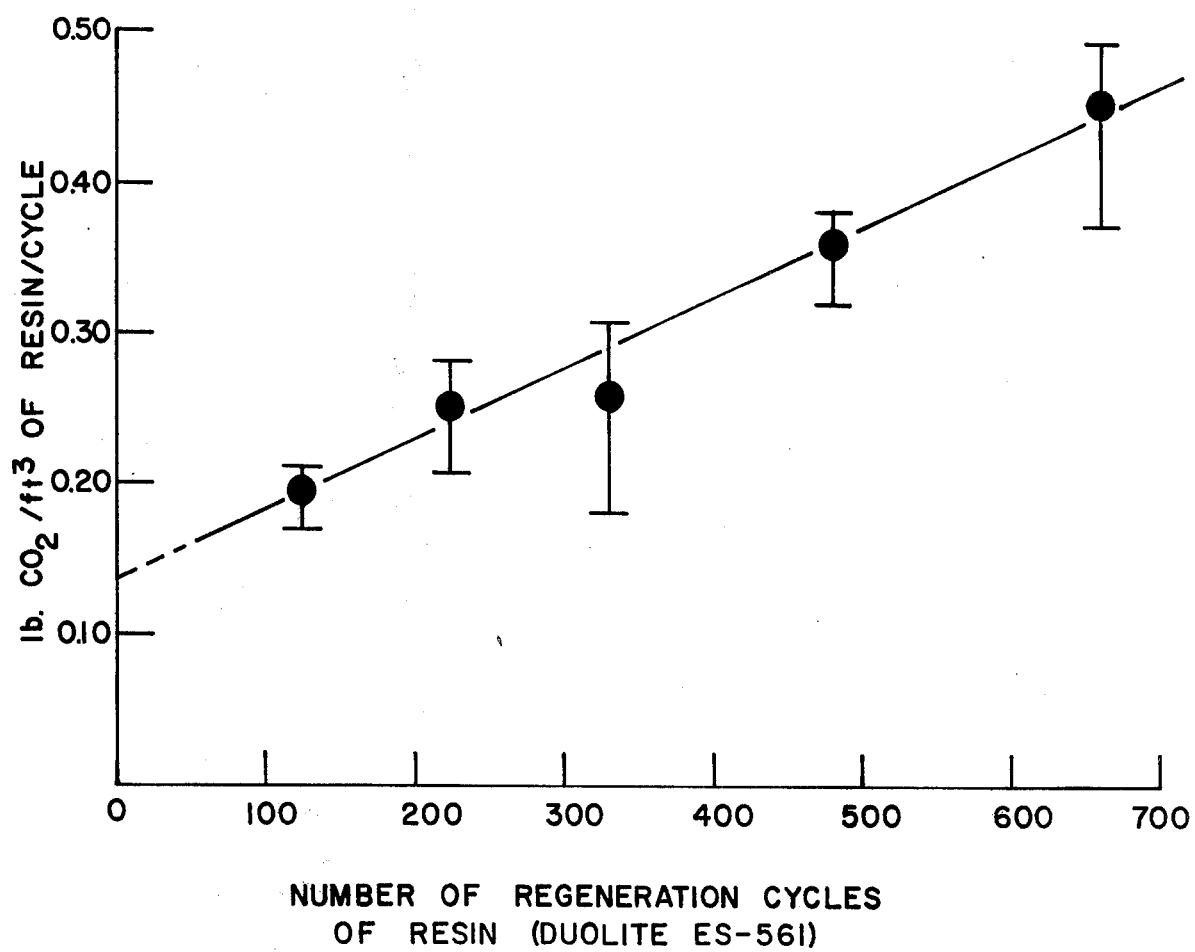

Utilization of carbonic acid (a water solution of carbon dioxide) during the fast rinse for removal of regenerant waste products from a weak base anion exchange resin provides a number of distinct advantages over the utilization of water or "decationized water" (water treated with a strong acid cation exchange resin in hydrogen ion form). First, the period of time for the fast rinse step may be reduced by about one-third that normally required at the same flow rate of the rinse, thus the resin is available for use more quickly than would otherwise be the case.

In commercial practice, it is necessary that a column of regenerated form resin be available to replace a column of resin in the system when it becomes exhausted. As the number of regeneration cycles increases, the rinse time required also increases. When the time required to regenerate and rinse the resin exceeds the time in which a column of resin is exhausted, the resin is discarded and replaced. Therefore, when carbonic acid is utilized in the fast rinse step, the operating life of the resin is extended because the resin can be regenerated a greater number of times before discarding than when water is utilized in the fast rinse step, due to the shorter time required with the carbonic acid rinse. Thus, a second advantage is that the accummulated total amount of product refined per $ft^3$ of resin is increased by use of the process of the instant invention. Furthermore, an economic saving of water is achieved because the time required for the fast rinse is reduced.

The concentration of the carbonic acid solution utilized may vary over a relatively wide range. Low concentrations of carbonic acid will not remove regenerant waste products as speedily as do more highly concentrated solutions. It is preferred that water saturated with $CO_2$ at ambient temperature and pressure be utilized. While super-saturated solutions can probably be utilized, no improvement is foreseen by such utilization.

The carbonic acid may be formed by simply bubbling $CO_2$ into a water-filled holding tank and then transferring the solution upwardly or downwardly through the column of resin to remove regenerant waste products or, the $CO_2$ may be introduced by suitable valve means into the rinse water being fed to the column.

The preferred regenerants utilized in this invention are solutions of NaOH, $Na_2CO_3$ and aqueous $NH_3$. The concentration and amounts of solution may vary widely but, for economic reasons, the least amount of solution which regenerates the resin to the desired degree is preferred. When sodium or similar ionic species are contained in the regenerant, the weak-acid groups on the resin are converted to sodium salts which, during water rinsing, are only slowly released or removed by hydrolysis. In the refining of corn syrups with ion exchange resins, it has sometimes been observed that after about 200 cycles of use, water rinsing to remove regenerant waste products takes such an inordinately long period that the resin is not ready for use when required. When this occurs, in certain instances, the resin is discarded even though the resin still has some exchange capacity.

FIG. 1 illustrates the amount of $CO_2$ which may typically be required to achieve a fast rinse effluent pH of about 9 versus the number of regeneration cycles the weak base resin was subjected to. Predictably, the amount of $CO_2$ necessary to achieve an effluent pH of 9 increased proportionally with the number of regeneration cycles. A solution of $Na_2CO_3$ was utilized during regeneration and the substrates refined were high fructose corn syrup and 94 DE corn syrup.

While it is contemplated that a variety of weak base resins may be utilized in the present process, the preferred types are those which contain primary, secondary and tertiary amine groups or mixtures of such groups. Exemplary of such resins are those marketed by Diamond Shamrock Chemical Company and Rohm and Haas Company under the trade names of Duolite® ES-561 and Amberlite® IRA-93, respectively.

In order to more clearly describe the nature of the present invention, specific Examples will hereinafter be described. It should be understood, however, that this is done solely by way of example and is intended neither to delineate the scope of the invention nor limit the ambit of the appended claims. In the Examples and through the specification, percentages refer to percent by weight unless otherwise specified.

EXAMPLE I

This Example illustrates the utilization of a solution of carbonic acid to fast rinse a regenerated weak base anion exchange resin on a laboratory scale.

The resin utilized in this example had 631 cycles of use in commercially refining a high fructose corn syrup. Two 50 ml samples of exhausted weak base anion exchange resin (Duolite® ES-561) were placed in a column (2.5 cm diam. ×30 cm high) and 63 ml of a 6 percent solution of $Na_2CO_3$ was passed through each of the columns, followed by a slow rinse utilizing 63 ml of deionized water at a rate of 2 ml/min.

The columns were then fast rinsed at a rate equivalent to 0.5 to 1.0 $GPM/ft^3$ of resin as follows:

Control column: fast rinsed with "decationized water" at pH 3.

Test column: fast rinsed with "decationized water" at pH 3 which had been saturated with $CO_2$ at ambient temperature and pressure.

Figure 2:
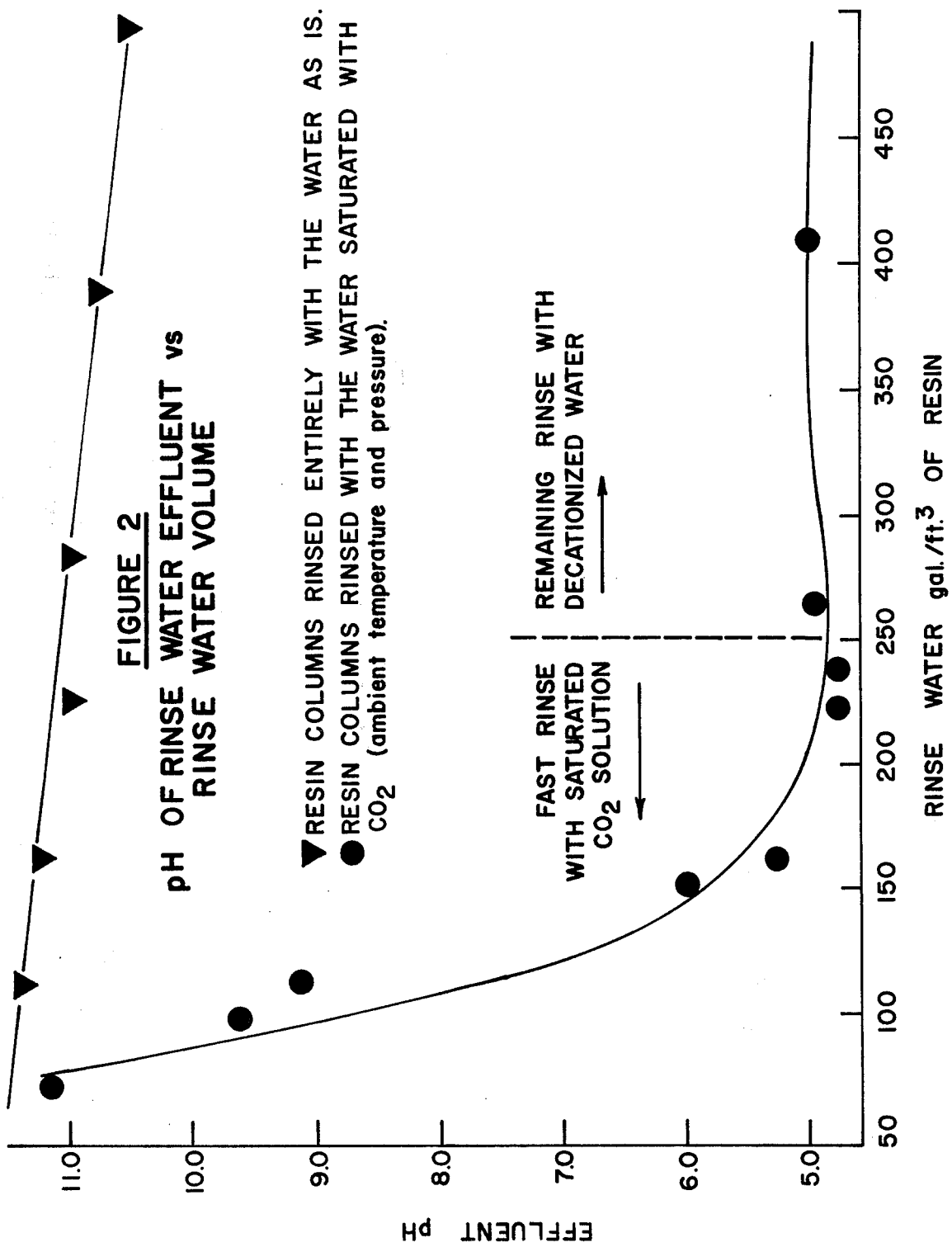

The pH values of the effluent solutions exiting the two columns at specified rinse volumes are shown in FIG. 2.

As indicated in FIG. 2, the pH of the effluent exiting from the column rinsed with $CO_2$ saturated water dropped dramatically in a very short period whereas the pH of the effluent exiting the control column rinsed with "decationized water" dropped only slowly and never reached a pH of below about 10 during the period of the test. FIG. 2 also shows that when the pH of the effluent rinse water reached about 5, the pH of the effluent remained relatively constant even when "decationized water" was used for further rinsing.

Figure 3:
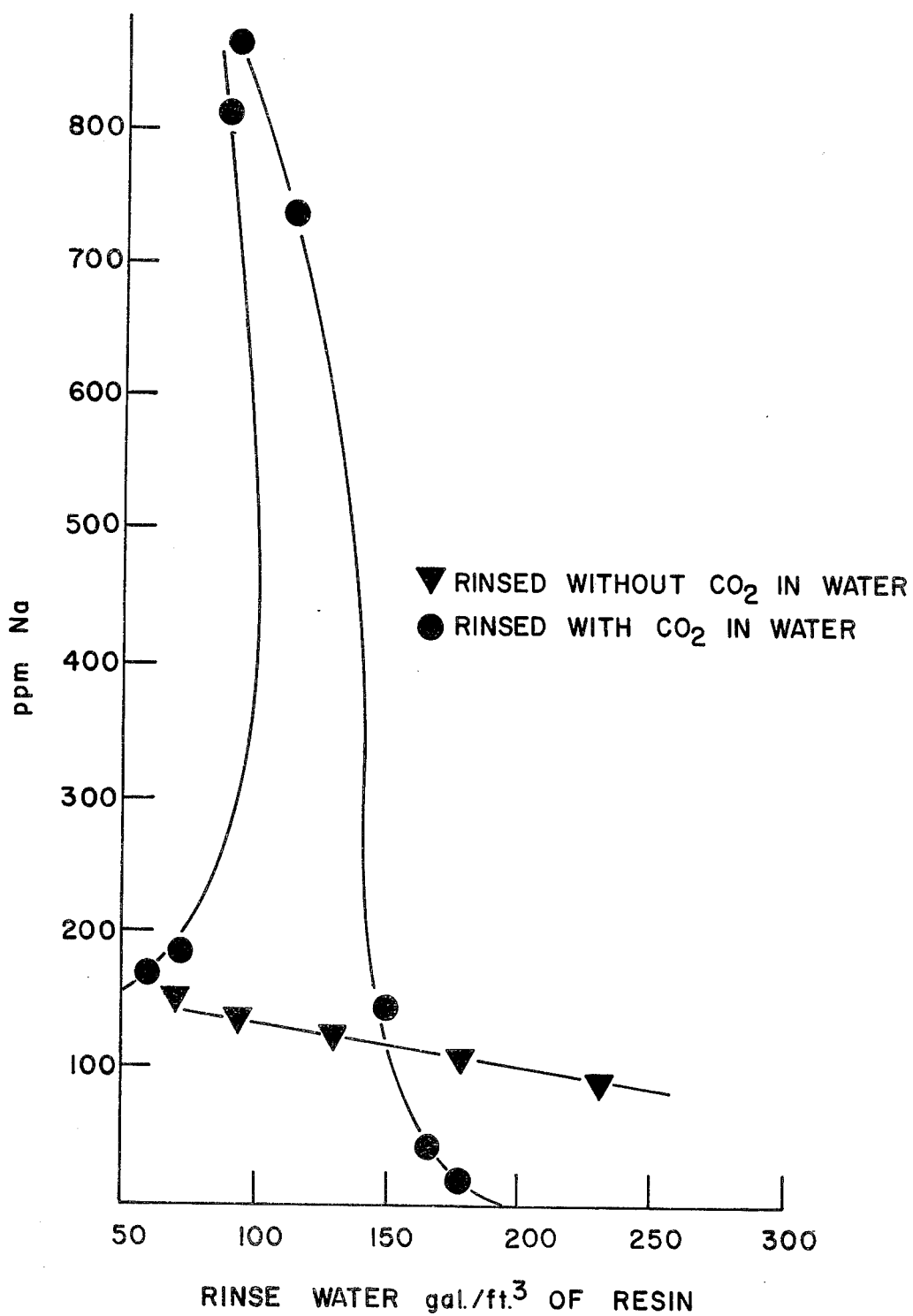

The amount of sodium in the effluents exiting the columns were plotted against the volumes of rinse water shown in FIG. 3. As shown by the curves in this figure, a much greater amount of sodium was contained in the effluent from the column fast rinsed with $CO_2$ saturated water.

EXAMPLE II

This Example illustrates the regeneration of weak base anion exchange resins that have been utilized to refine corn syrup in commercial practice.

After 699 cycles of use in refining an enzymatically produced high fructose corn syrup, two columns, each containing about 50 cubic feet of weak base anion exchange resin (Duolite® ES-561), were regenerated with a sufficient amount of a solution of $Na_2CO_3$ to provide 4.5 pounds $Na_2CO_3$ per cubic foot of resin. The resin column was then slow rinsed with about 400 gal "decationized water" at a rate of 13 GPM.

The control resin column was then fast rinsed with "decationized water" at a pH of 3 and the other column was rinsed with "decationized water" at pH 3 saturated with $CO_2$ at ambient temperature and pressure. Both fast rinses were conducted at an average flow rate of about 43 gallons per minute.

Figure 4:
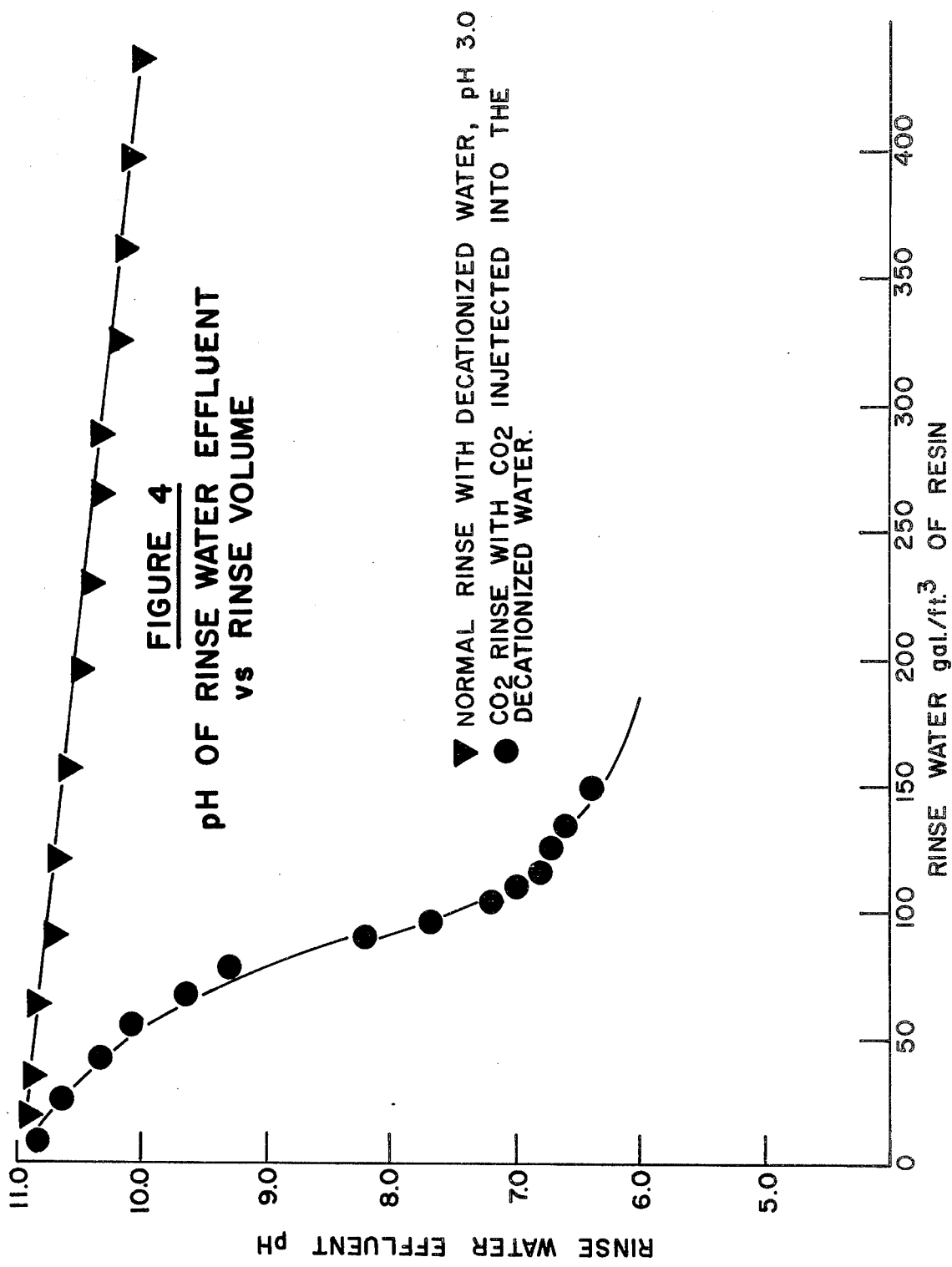

The pH values of the effluent solutions exiting the two columns are shown in FIG. 4.

EXAMPLE III

This Example illustrates the regeneration of weak base anion exchange resins that have been utilized to refine a carbon treated 94 DE corn syrup over a number of cycles.

The parameters within which this Example performed are set forth in Table I below together with the results obtained.

TABLE I

| | Fast Rinse With Saturated $CO_2$ Solution | | | Fast Rinse With Water | | |
|---|---|---|---|---|---|---|
| | Columns | | | | | |
| | 1 | 2 | 3 | 1 | 2 | 3 |
| Average Number of Regeneration Cycles Completed During the Comparitive Test | 216 | 122 | 333 | 216 | 122 | 333 |
| lbs. of $Na_2CO_3$ per cubic ft of resin utilized for regeneration | 5.0 | 5.0 | 5.0 | 5.0 | 5.0 | 5.0 |
| slow rinse volume (gal/$ft^3$ resin) | 10 | 10 | 10 | 10 | 10 | 10 |
| average fast rinse volume (gal/$ft^3$ resin) | 93 | 70 | 88 | 381 | 180 | 451 |
| average fast rinse flow rate (GPM/$ft^3$ resin) | 0.6 | 0.6 | 0.6 | 0.6 | 0.6 | 0.6 |
| average period (min.) to achieve pH 10.0 | 153 | 115 | 145 | 630 | 297 | 746 |

EXAMPLE IV

This Example illustrates that by following the regeneration process of the present invention, the amount of acid necessary to lower the pH of the refined high fructose corn syrup after refining is substantially reduced.

Generally, after refining a high fructose corn syrup, the pH thereof is reduced to about 4.5 since this is the pH at which the stability of the syrup against color formation is the greatest.

Figure 5:
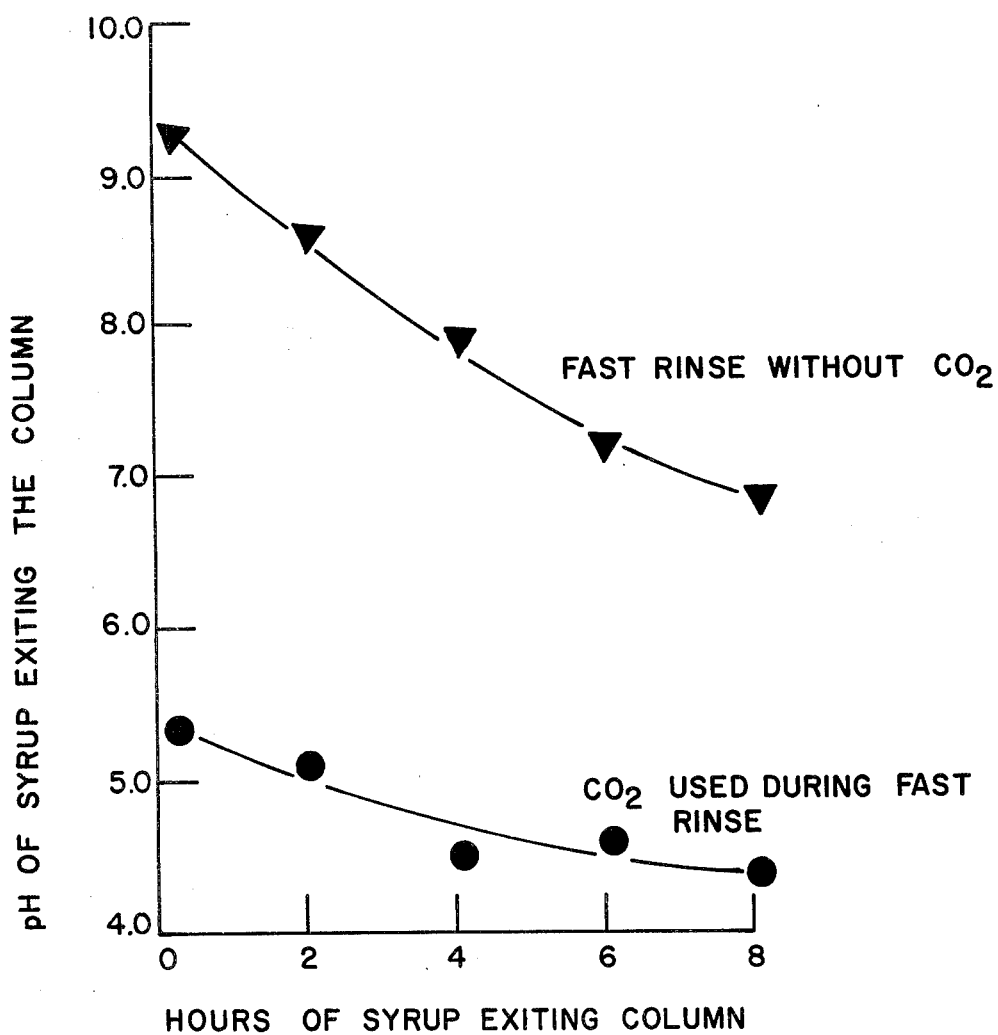

Two columns of exhausted weak base anion exchange resin (Duolite® ES-561) were regenerated and slow rinsed with "decationized water." One column was fast rinsed with a saturated water solution of $CO_2$ at pH 3 and the other fast rinsed with "decationized water" also at pH 3. High fructose corn syrup was passed through each of the columns at the same flow rate and the pH's of the effluents of the high fructose corn syrups exiting the columns were determined and are shown in FIG. 5. Because of the relatively low pH values of the high fructose corn syrup exiting the column which was fast rinsed with a saturated water solution of $CO_2$, less acid was required to lower the pH of the same to the desired level than the corn syrup exiting the column which was fast rinsed with "decationized water."

What is claimed is:

1. In a process for regenerating exhausted weak base anion exchange resins which have been contacted with a regenerant solution under conditions whereby the anion exchange capacity of the resins is substantially restored and regenerant waste products are produced, the improvement comprising sequentially washing the resins with water to remove a portion of the regenerant waste products and then washing the resins with a solution of carbonic acid to remove additional amounts of regenerant waste products.

2. A process for regenerating exhausted weak base anion exchange resins as defined in claim 1, wherein the regenerant is selected from the group consisting of solutions of NaOH, $Na_2CO_3$ and aqueous $NH_3$.

3. A process for regenerating exhausted weak base anion exchange resins as defined in claim 1, wherein the regenerant solution comprises a source of Na ions.

4. A process for regenerating exhausted weak base anion exchange resins as defined in claim 1, wherein the carbonic acid is formed by saturating water with $CO_2$ at ambient temperature and pressure.

5. A process for regenerating exhausted weak base anion exchange resins as defined in claim 1, wherein the resins contain primary, secondary or tertiary amine groups or mixtures thereof.

6. A process for regenerating exhausted weak base anion exchange resins as defined in claim 5, wherein the resin has been utilized to refine corn syrups.

7. A process for regenerating exhausted weak base anion exchange resin as defined in claim 5, wherein said resin disposed in a column is washed by passing water upwardly through the column to remove insoluble debris and to reclassify the resin; regenerant solution is passed downwardly through the column to restore the anion exchange capacity of the resin and regenerant waste products are formed, an amount of water about equal to the volume of the regenerant solution is passed downwardly through the column to remove the regenerant and a portion of the regenerant waste products, and then a solution of carbonic acid is rapidly passed through the column to remove additional amounts of regenerant waste products.

8. A process for regenerating exhausted weak base anion exchange resins as defined in claim 6, wherein resins which have been regenerated after more than about 200 cycles of use are contacted with a sufficient amount of a solution of carbonic acid to lower the pH of the resins to below about 9.

9. A process for regenerating exhausted weak base anion exchange resins as defined in claim 1, wherein the step of washing the resins with a solution of carbonic acid is conducted at a flow rate faster than the washing step wherein the resins are washed with water.

* * * * *